US007311597B2

(12) United States Patent
Thomas

(10) Patent No.: US 7,311,597 B2
(45) Date of Patent: Dec. 25, 2007

(54) METHOD AND APPARATUS FOR CONDUCTING A VIDEO POKER GAME

(75) Inventor: Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 612 days.

(21) Appl. No.: 10/658,976

(22) Filed: Sep. 10, 2003

(65) Prior Publication Data

US 2005/0055114 A1 Mar. 10, 2005

(51) Int. Cl.
*A63F 13/00* (2006.01)

(52) U.S. Cl. .......................................... 463/13; 463/25

(58) Field of Classification Search .................. 463/13, 463/25

See application file for complete search history.

(56) References Cited

U.S. PATENT DOCUMENTS 5,033,744 A 7/1991 Bridgeman et al. ........... 273/85
5,100,137 A 3/1992 Fulton .................... 273/85 CP
5,242,163 A 9/1993 Fulton .................... 273/85 CP
5,415,404 A 5/1995 Joshi et al. ............ 273/138 A
5,489,101 A 2/1996 Moody ....................... 273/292
5,816,916 A 10/1998 Moody ........................ 463/13
5,820,460 A 10/1998 Fulton ......................... 463/13
5,823,873 A 10/1998 Moody ........................ 463/13
5,833,536 A * 11/1998 Davids et al. ................ 463/11
6,368,212 B1 4/2002 Moody ........................ 463/13
6,419,578 B1 7/2002 Moody et al. ................ 463/13
6,517,074 B1 2/2003 Moody et al. .............. 273/292
6,561,898 B2 5/2003 Moody ........................ 463/13
6,565,432 B2 5/2003 Moody ........................ 453/13
6,568,680 B1 5/2003 Moody et al. .............. 273/292
2002/0037762 A1* 3/2002 Wood et al. .................. 463/13
2002/0125641 A1* 9/2002 Moody ....................... 273/292
2003/0092487 A1* 5/2003 Meyer ......................... 463/30
2003/0119579 A1 6/2003 Walker et al. ................ 463/20
2003/0137109 A1* 7/2003 Vancura ...................... 273/292
2003/0153383 A1* 8/2003 Baerlocher et al. ........... 463/25
2004/0063483 A1* 4/2004 Wolf et al. ................... 463/13

FOREIGN PATENT DOCUMENTS

WO WO 03/069568 A1 8/2003

* cited by examiner

*Primary Examiner*—John M. Hotaling, II
(74) *Attorney, Agent, or Firm*—Nixon Peabody, LLP.

(57) ABSTRACT

A method and apparatus for conducting a video draw poker game is disclosed. The poker game defines a plurality of award-winning rankings and awards associated with the rankings. The apparatus includes a value input device for receiving a wager, a display for displaying the poker game, and a processor for conducting the poker game. The poker game may, for example, play like conventional draw poker except if and only if the dealt hand (prior to the draw) has one of the award-winning rankings, winning ones of the cards that yield the award-winning ranking are distinguished from other ones of the cards. The winning cards may be distinguished automatically or in response to a player input.

25 Claims, 7 Drawing Sheets

METHOD AND APPARATUS FOR CONDUCTING A VIDEO POKER GAME

FIELD OF THE INVENTION

The present invention relates generally to video poker and, more particularly, to a draw poker game that, prior to the draw, distinguishes winning cards of a winning hand from non-winning cards.

BACKGROUND OF THE INVENTION

Video draw poker has been played in gaming establishments for many years. In conventional video draw poker, a single player does not play against a dealer or other players, but rather attempts to achieve a highest possible poker hand ranking. After a player makes an initial wager and is dealt five face-up cards from a standard 52-card deck, the player is allowed to discard and replace unwanted cards with replacement cards from the deck, resulting in a final card hand. The game then determines a poker hand ranking of the final card hand and provides an award based on a pay table. The pay table includes a list of winning poker hand rankings and the award for each ranking. The winning poker hand rankings for a standard Jacks or Better video poker game include in order from highest to lowest: Royal Flush, Straight Flush, Four of a Kind, Full House, Flush, Straight, Three of a Kind, Two Pair and a Pair of Jacks or Better. Any poker hand having a ranking less than a Pair of Jacks or Better is a losing hand.

Manufacturers have developed variations to conventional video draw poker. One objective in developing such variations is to differentiate a video poker product from that of the competition. Another objective is to increase the speed of play and/or the number of coins or credits wagered. For example, one variation to conventional video draw poker is an auto-hold feature whereby, prior to the draw, the game automatically holds the dealt cards that represent a calculated optimum play. Although the auto-hold feature may increase the speed of play and therefore the number of coins/credits wagered, the auto-hold feature tends to annoy players. If a player disagrees with the automatically held cards, the player must "unhold" those cards and then hold the cards the player wishes to hold. As casino patrons become bored or annoyed with existing variations to conventional video draw poker, gaming establishments are continually looking for new video poker games that will attract frequent play and hence increase profitability to the gaming establishment.

SUMMARY OF THE INVENTION

A method and apparatus for conducting a video draw poker game is disclosed. The poker game defines a plurality of award-winning rankings and awards associated with the rankings. The apparatus includes a value input device for receiving a wager, a display for displaying the poker game, and a processor for conducting the poker game. The poker game may, for example, play like conventional draw poker except if and only if the dealt hand (prior to the draw) has one of the award-winning rankings, winning ones of the cards that yield the award-winning ranking are distinguished from other ones of the cards. The winning cards may be distinguished automatically or in response to a player input.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings.

FIG. 3 is an image of the poker game prior to dealing a hand.

FIG. 4 is an image of the poker game after dealing a winning hand but prior to a player selecting which cards to hold.

FIG. 5 is an image of the poker game with the winning cards of the winning hand "flashed" to temporarily highlight them.

FIG. 6 is an image of the poker game with the winning cards of the winning hand designated as cards to be held in response to a player pressing an "easy hold" key.

FIG. 7 is an image of the poker game after the designated winning cards are held and the non-held cards are replaced with new cards drawn from the deck, whereby the player is paid for the winning hand according to its ranking on a pay table.

Figure 1:
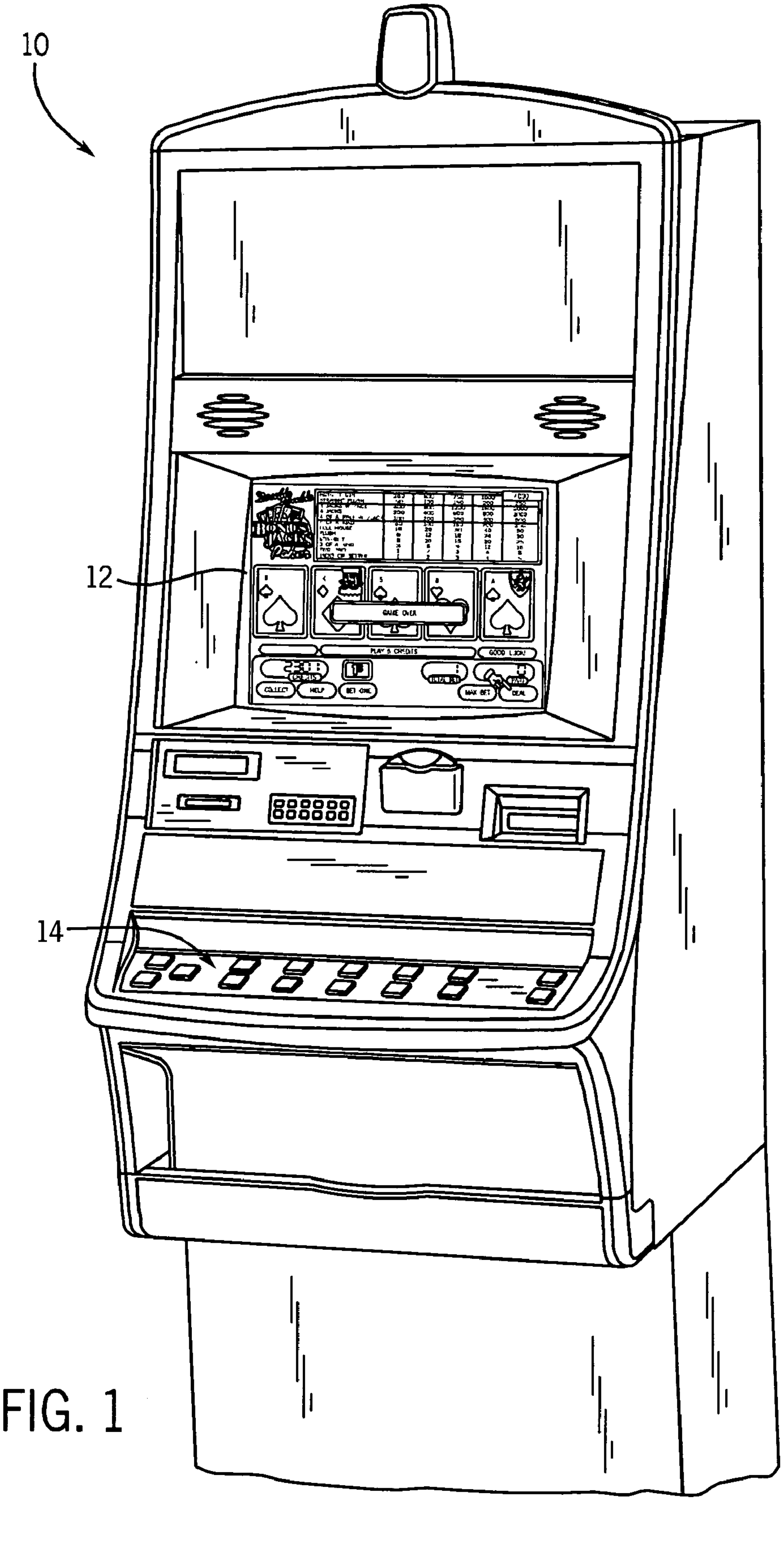
FIG. 1 is a perspective view of a gaming machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings, FIG. 1 is a perspective view of a gaming machine 10 operable to conduct a video draw poker game. The gaming machine 10 includes a video display 12 for depicting images associated with the poker game. The display 12 may be a cathode ray tube, liquid crystal display, plasma or other type of video display known in the art. The display 12 is preferably outfitted with a touch screen to facilitate interaction with the player. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10.

Figure 2:
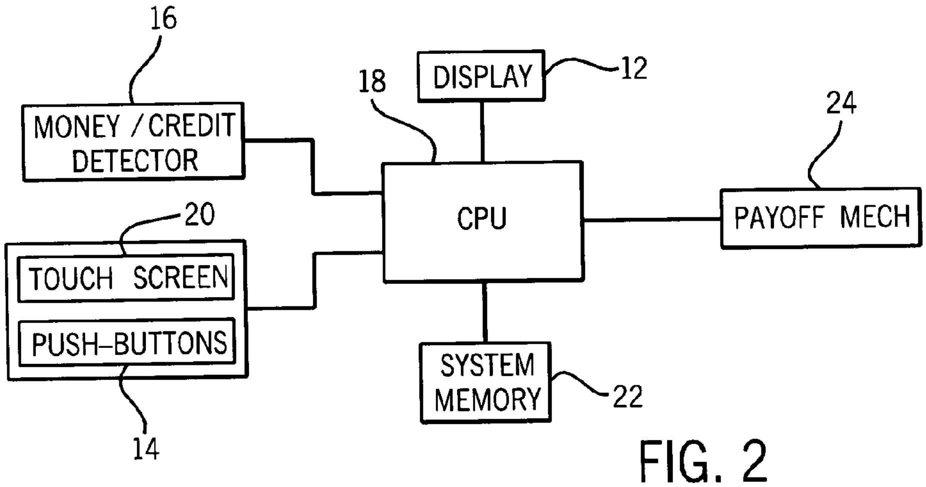
FIG. 2 is a block diagram of a control system suitable for operating the gaming machine.

FIG. 2 is a block diagram of a control system suitable for operating the gaming machine. Money/credit detector 16 signals a central processing unit (CPU) 18 when a player has inserted money or played a number of credits. The money may be provided by coins, bills, tickets, coupons, cards, etc. Using a button panel 14 (see FIG. 1) or a touch screen 20, the player may select various options associated with the video poker game, including a wager amount. For each play of the game, the CPU 18 generates at least one random event using a random number generator (RNG) and provides an award to the player for a winning outcome of the random event. The CPU 18 operates the display 12 to represent the random event(s) and outcome(s) in a visual form that can be understood by the player. In addition to the CPU 18, the control system may include one or more additional slave control units for operating one or more of the machine peripherals such as the display 12.

A system memory 22 stores control software, operational instructions and data associated with the gaming machine 10. In one embodiment, the system memory 22 comprises read-only memory (ROM), high capacity storage memory (e.g., Compact Flash), serial read-write memory, and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player in response to any outcomes that include a payoff. The payoff may, for example, be in the form of a number of credits. The number of credits are determined by one or more math tables stored in the system memory 22.

FIGS. 3 through 7 illustrate a video draw poker game embodying the present invention. The poker game is preferably played with a single standard 52-card deck (i.e., Ace through King of four different suits). One or more cards (e.g., deuces, sevens, one-eyed jacks, etc.) may be considered wild. One or more Jokers may be added to the standard deck. Further, the poker game may be played an additional predefined special card(s) (e.g., a "Go Fish!" card) for triggering a special feature (e.g., a "Go Fish!" feature). Such a special feature is disclosed in detail in U.S. patent application Ser. No. 10/436,002 filed May 12, 2003, entitled "Method of Conducting a Video Poker Game," and incorporated herein by reference in its entirety. During a particular poker hand, all dealt and drawn cards come from the same deck. After a card is dealt or drawn from the deck into the poker hand, the card is "used up" and cannot appear again until the next poker hand. The deck is preferably replenished and randomly shuffled prior to every poker hand. The system memory 22 includes a data structure for storing data representing each card of the deck. The CPU 18 selects cards for each poker hand from the data structure and controls the video display 12 to display the cards.

Figure 3:
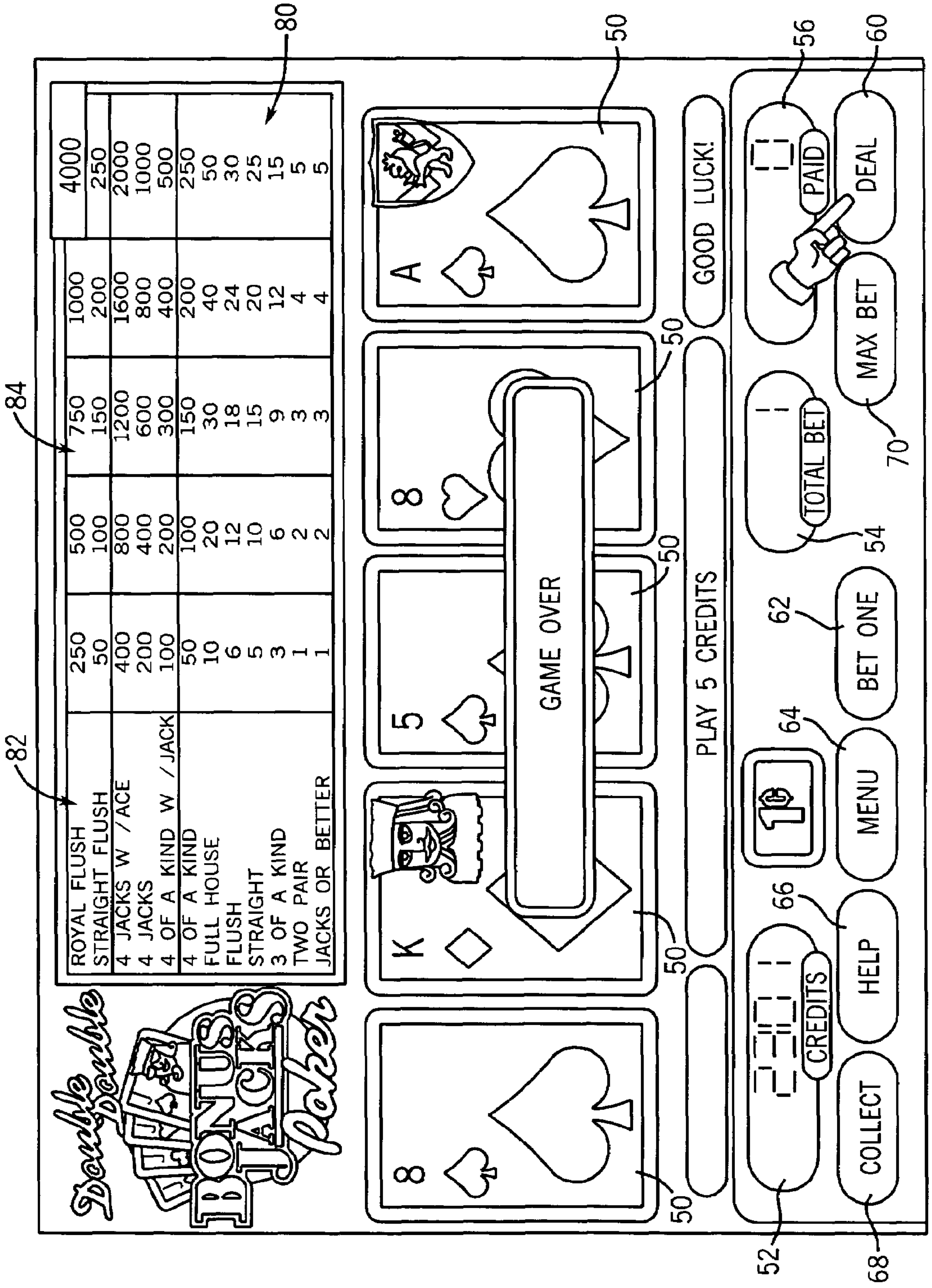
FIGS. 3 through 7 illustrate a video draw poker game including both a "flash" feature and "easy hold" feature for distinguishing winning cards of a winning hand from non-winning cards prior to the draw.

FIG. 3 is an image of the poker game prior to dealing a hand. The image includes five playing cards 50, game session meters, various buttons selectable by a player, and a pay table 80. The game session meters include a "credits" meter 52 for displaying a number of credits available for play on the machine; "bet" meter 54 for displaying a number of credits wagered (e.g., from 1 to 5 credits); and a "win" meter 56 for displaying a number of credits won as a result of the most recent play.

The player-selectable buttons include a "deal"/"draw" button 60 for causing the game to initially deal cards from a deck into a hand and for later causing the game to draw cards from a deck to replace any non-held cards in the hand; a "bet one" button 62 for wagering one credit for each press of the button; a "menu" button 64 for accessing extra functions such as viewing a pay table; a "help" button 66 for viewing instructions on how to play the video poker game; and a "collect" button 68 for collecting any credits remaining on the credits meter 52 at the end of a game session; and a "max bet"/"easy hold" button 70. When the button 70 is a "max bet" button, it is used to wager a maximum number of credits (e.g., 5 credits) without having to repeatedly press the "bet one" button 62. When a potential win is dealt, the button 70 becomes an "easy hold" button that allows the player to hold all the winning cards in the dealt hand, prior to the draw, with a single press of the button. The buttons may, for example, also include a "speed" button for changing the speed at which cards are dealt from the deck (e.g., slow, medium, or fast).

The pay table 80 is preferably positioned above the playing cards 50. The pay table 80 includes a list of winning poker hand rankings 82 and the number of credits won 84 for each ranking. The number of credits won is linearly proportional to the number of credits wagered, except that a royal flush yields a bonus when achieved on a maximum wager. Further, the pay table 80 awards certain premiums for Four of a Kind involving Jacks alone or four Jacks with an Ace.

Figure 4:
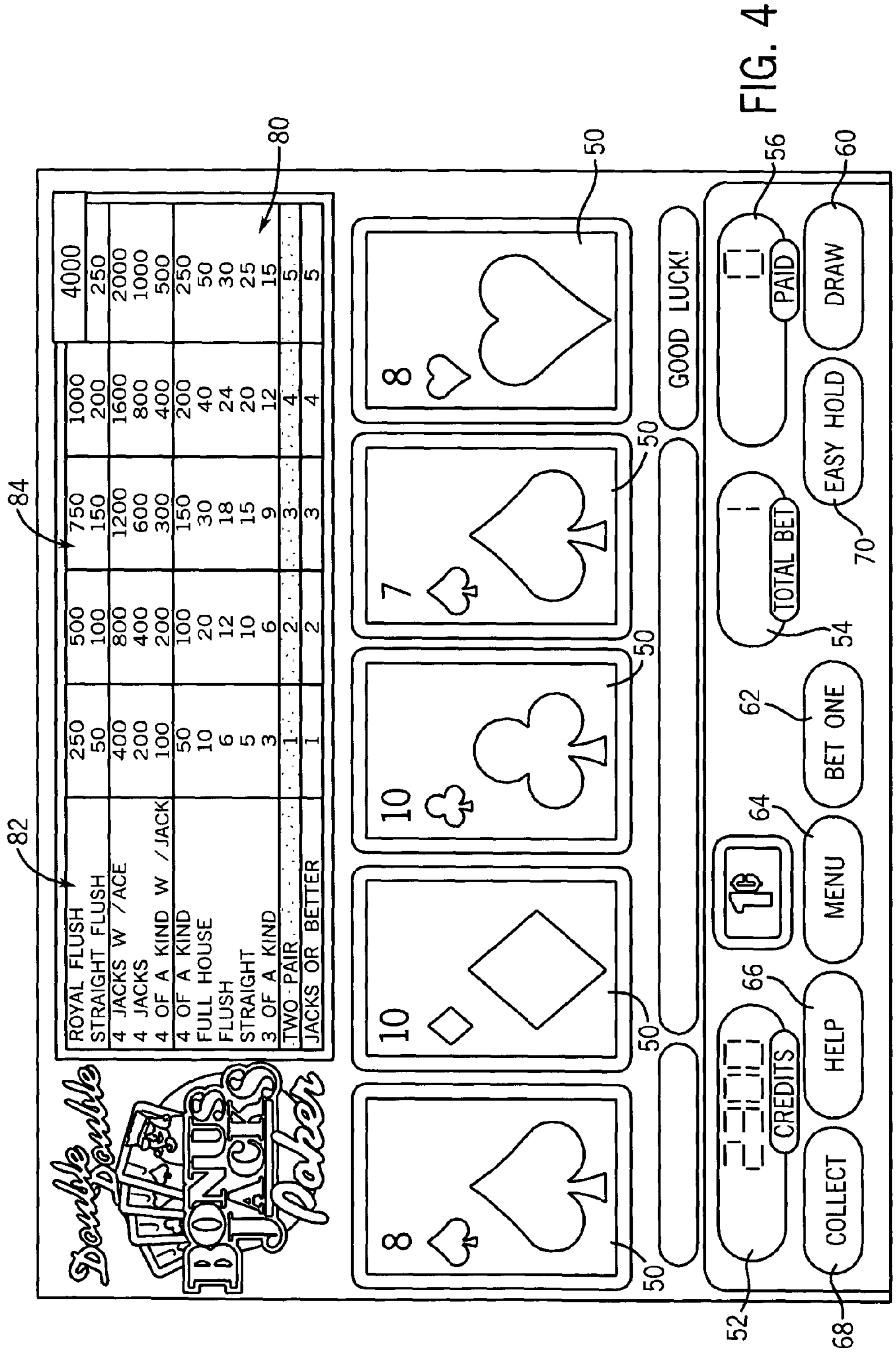

FIG. 4 is an image of the poker game after a player (i) makes a wager of 1 credit and (ii) is initially dealt five face-up cards from a shuffled deck into a poker hand. In the illustrated example, the player is initially dealt a hand including 8♠, 10♦, 10♣, 7♠, and 8♥. This hand has one of the winning rankings 82 on the pay table 80, namely Two Pair.

Figure 5:
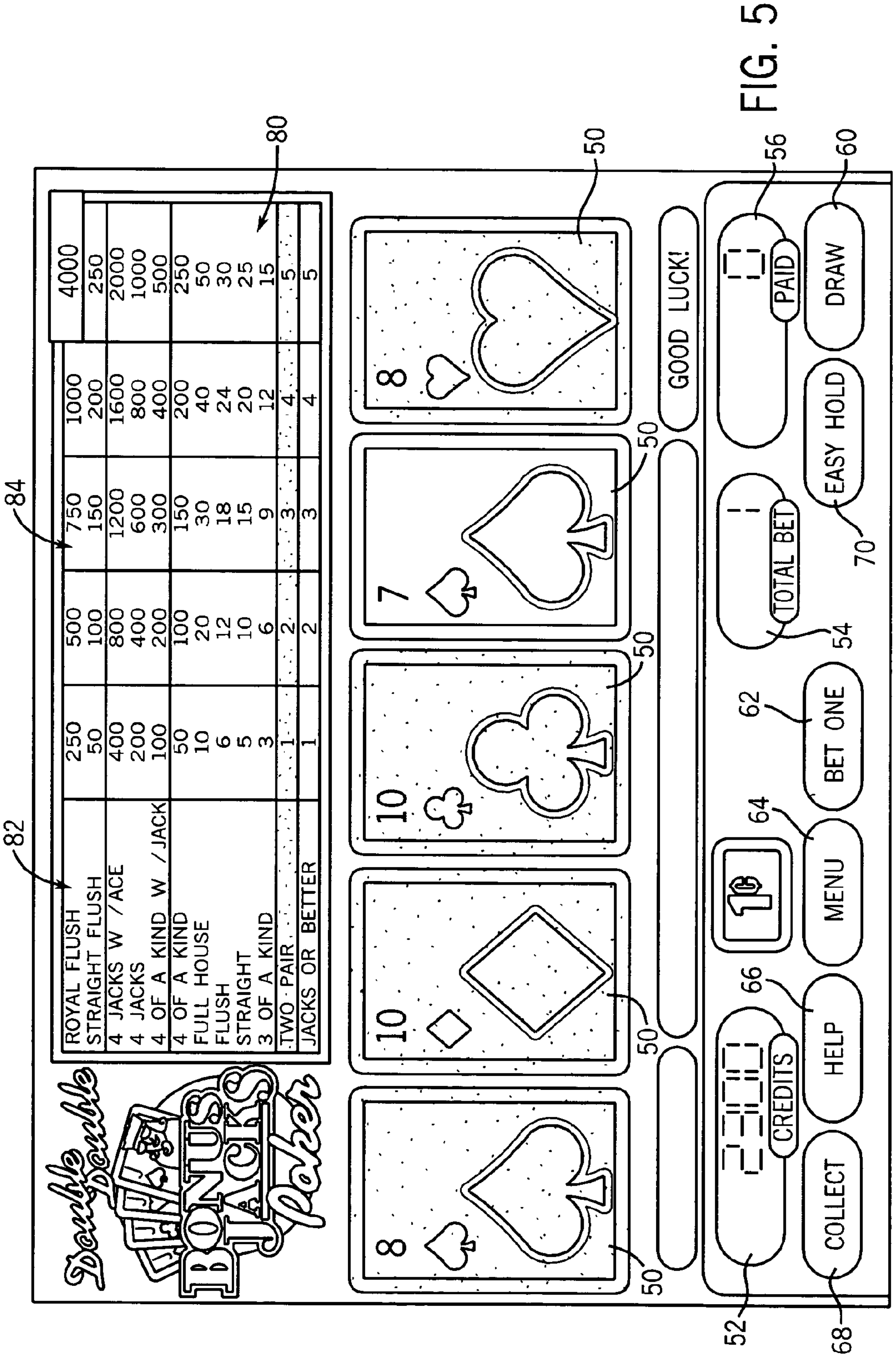
Figure 6:
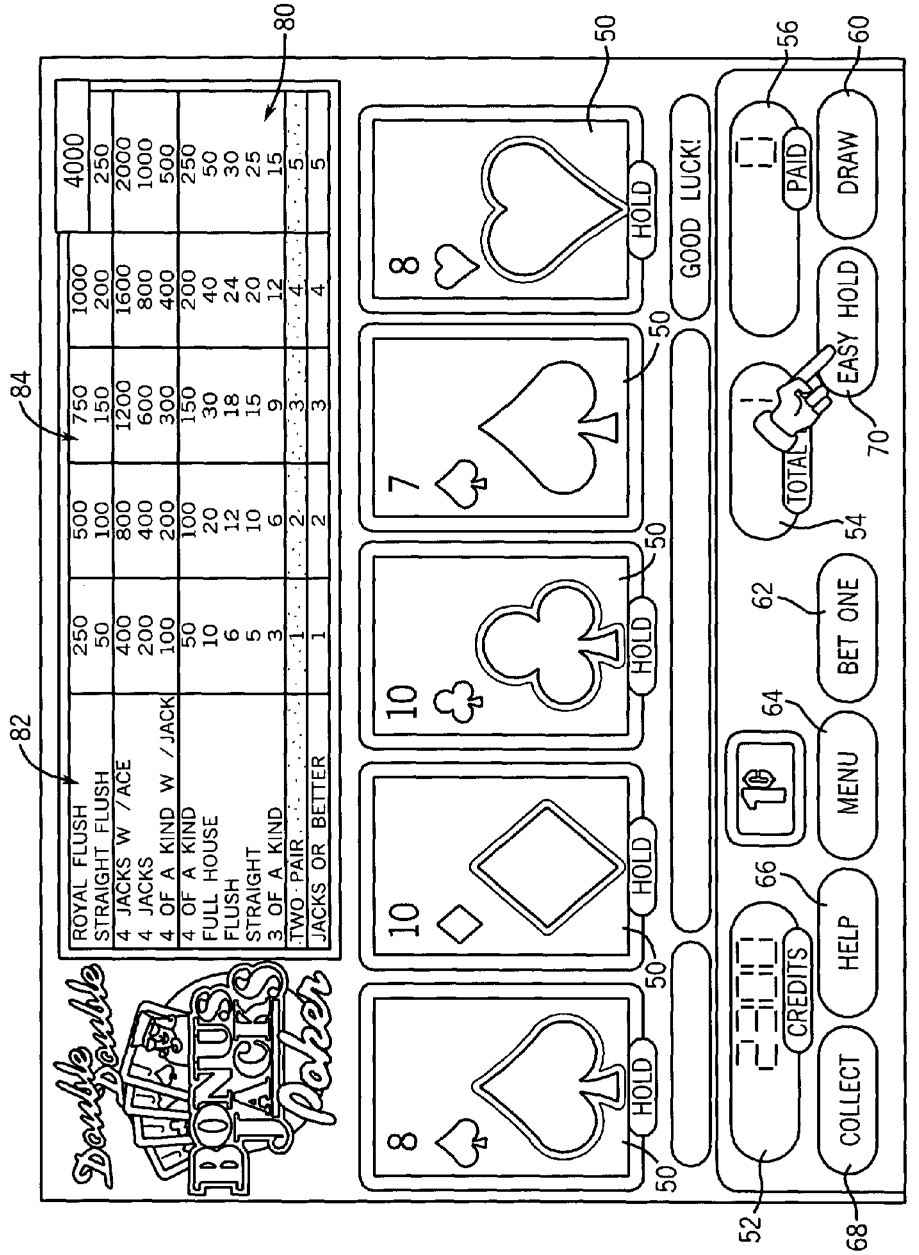

In accordance with the present invention, if and only if the dealt hand has one of the winning rankings 82 on the pay table 80, potential winning ones of the cards that yield the winning ranking are distinguished from "non-winning" ones of the cards. If the dealt hand has more than one of the winning rankings 82 on the pay table 80, potential winning ones of the cards that yield the highest winning ranking are distinguished from non-winning ones of the cards. The non-winning cards are those cards that do not contribute to the winning ranking, i.e., do not reduce the ranking of the hand if removed therefrom. In the illustrated example, the potential winning cards that yield the Two Pair ranking are 8♠, 10♦, 10♣, and 8♥, while the only non-winning card is the 7♠. The potential winning cards may be distinguished from the non-winning cards automatically (FIG. 5) and/or in response to player input (FIG. 6).

More specifically, when the dealt hand has one of the winning rankings 82 on the pay table 80, a variety of things occur. First, the pay table 80 highlights the potential winning ranking 82 as shown in FIGS. 4-6. Here, the highlighted ranking 82 is Two Pair. Second, the potential winning cards automatically run through a rapid flash and fade animation to temporarily illuminate them as shown in FIG. 5. FIG. 5 represents the temporary illumination of the potential winning cards with stippling. Third, an "easy hold" function is activated. The on-screen "max bet" button 70 changes to the "easy hold" button 70 as shown in FIGS. 4-6, and a "max bet" button on the physical button panel 14 (see FIG. 1) illuminates. Referring to FIG. 6, the player can optionally press the onscreen "easy hold" button 70 or the illuminated "max button" on the button panel 14 to hold the potential winning cards. When held, the potential winning cards are toggled to an illuminated state and labeled as "hold." The "hold" indicia may appear beneath, above, or on the potential winning cards.

Instead of pressing the "easy hold" button 70, the player may ignore the "easy hold" function and individually select which of the face-up cards to replace in a conventional manner. The player indirectly selects which cards to replace by touching those cards that the player desires to hold. In an alternative embodiment, the player directly selects which cards to replace by touching those cards that the player desires to discard.

Figure 7:
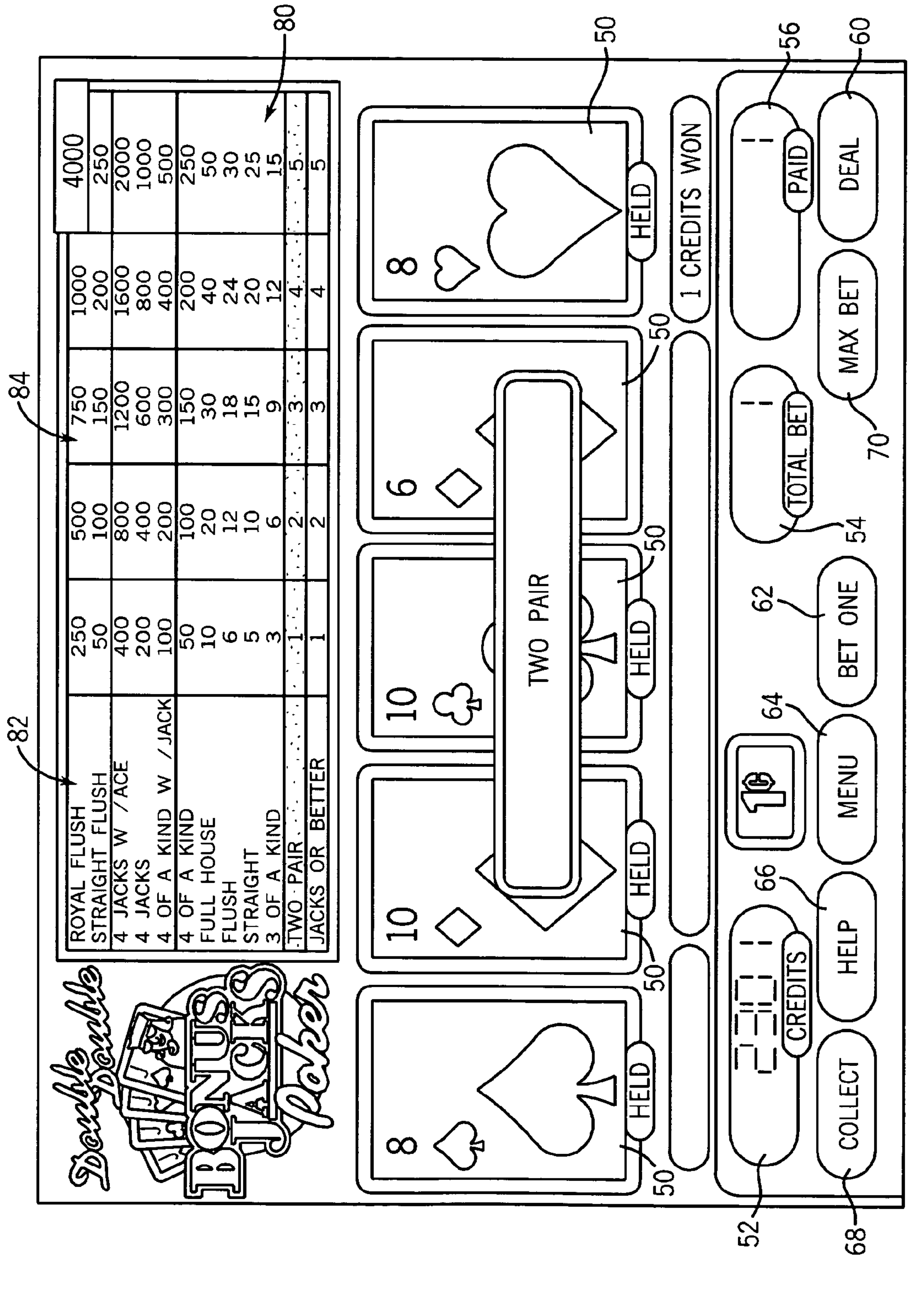

After the player uses the "easy hold" function as illustrated (by pressing the "easy hold" button 70) or touches those cards that the player wishes to hold, the player presses the "draw" button 60. FIG. 7 is an image of the poker game after the potential winning cads are held and the non-held cards are replaced with new cards drawn from the deck. In the illustrated example, the draw results in a final hand including 8♠, 10♦, 10♣, 6♦, and 8♥. The game determines the poker hand ranking of the final poker hand to be Two Pair. The pay table 80 highlights this ranking. On a wager of 1 credit, the award for Two Pair is 1 credit, i.e., a return of the original wager.

While the present invention has been described with reference to one or more particular embodiments, those skilled in the art will recognize that many changes may be made thereto without departing from the spirit and scope of the present invention.

For example, alternative visual mechanisms may be used to distinguish the potential winning cards in a dealt hand from the non-winning cards. The potential winning cards (or the non-winning cards) may be illuminated, grayed or shaded, enlarged in size relative to the non-winning cards, reduced in size relative to the non-winning cards, surrounded by a special border, marked with special text or other indicia, moved to a different region of the display image, shifted upward or downward relative to the non-winning cards, tilted relative to the non-winning cards, etc.

Furthermore, the present invention may be implemented in any video draw poker game. Examples include basic draw poker (standard 52-card deck), Aces and Eights poker (standard 52-card deck with premium awarded for Four of a Kind with either Aces or Eights), Aces and Faces poker (standard 52-card deck with premium awarded for Four of a Kind with either Aces or Faces), Bonus poker (standard 52-card deck with premium awarded for Four of a Kind with either Aces, Twos, Threes, or Fours), Double Bonus poker (variation of Bonus poker with premium awarded for some of the higher ranking hands), Double Double Bonus poker (another variation of Bonus poker with premium awarded for some of the higher ranking hands), Deuces Wild poker (standard 52-card deck with Twos wild), Joker Wild poker (standard 52-card deck plus one wild joker), Deuces and Joker Wild poker (standard 52-card deck with Twos wild plus one wild joker), Double Draw poker (two draws instead of one), etc. Each poker hand may use more than one deck of cards. The deck(s) of cards need not be replenished and shuffled prior to every poker hand.

Each of these embodiments and obvious variations thereof is contemplated as falling within the spirit and scope of the claimed invention, which is set forth in the following claims.

What is claimed is:

1. A method of conducting a video draw poker game, the poker game defining a plurality of award-winning rankings and awards associated with the rankings, the method comprising:

receiving a wager;

dealing a plurality of playing cards into a hand;

if and only if the dealt hand has one of the award-winning rankings, distinguishing winning ones of the cards that yield the award-winning ranking from other ones of the cards;

after the distinguishing step, selecting, directly or indirectly, none or more of the cards to be replaced;

replacing each of the selected cards with a respective replacement card to form a final hand;

determining a poker hand ranking of the final hand; and providing an award when the determined poker hand ranking meets a predetermined criterion.

2. The method of claim 1, wherein the distinguishing step occurs in response to a player's activation of an easy hold function.

3. The method of claim 2, wherein the player's activation of the easy hold function is accomplished by pressing an easy hold key.

4. The method of claim 1, wherein the distinguishing step includes labeling the winning ones of the cards as cards to be held.

5. The method of claim 1, wherein the distinguishing step occurs automatically without player input.

6. The method of claim 5, wherein the distinguishing step includes highlighting the winning ones of the cards.

7. The method of claim 6, wherein the highlighting step includes flashing the winning ones of the cards.

8. The method of claim 1, wherein the plurality of cards include at least five cards.

9. The method of claim 1, wherein the cards are dealt from a deck including at least 52 standard playing cards.

10. The method of claim 1, wherein the selecting step is performed by a player.

11. An apparatus for conducting a video draw poker game, the poker game defining a plurality of award-winning rankings and awards associated with the rankings, the apparatus comprising:

a value input device for receiving a wager;

a display for displaying the poker game; and a processor operative to deal a plurality of playing cards into a hand;

if and only if the dealt hand has one of the award-winning rankings, cause the display to distinguish winning ones of the cards that yield the award-winning ranking from other ones of the cards;

select, directly or indirectly, none or more of the cards to be replaced;

replace each of the selected cards with a respective replacement card; and determine a poker hand ranking of the hand.

12. The apparatus of claim 11, wherein the processor causes the display to distinguish the winning ones of the cards from the other ones of the cards in response to a player's activation of an easy hold function.

13. The apparatus of claim 12, further including an easy hold key, operable by the player, for activating the easy hold function.

14. The apparatus of claim 11, wherein the processor causes the display to label the winning ones of the cards as cards to be held to distinguish the winning ones of the cards from the other ones of the cards.

15. The apparatus of claim 11, wherein the processor causes the display to distinguish the winning ones of the cards from the other ones of the cards without player input.

16. The apparatus of claim 15, wherein the processor causes the display to highlight the winning ones of the cards to distinguish the winning ones of the cards from the other ones of the cards.

17. The apparatus of claim 16, wherein the processor causes the display to flash the winning ones of the cards to highlight the winning ones of the cards.

18. The apparatus of claim 11, wherein the plurality of cards include at least five cards.

19. The apparatus of claim 11, wherein the cards are dealt from a deck including at least 52 standard playing cards.

20. The apparatus of claim 11, wherein the processor is operative to select none or more of the cards in response to player input.

21. A method of conducting a video draw poker game, the poker game defining a plurality of award-winning rankings and awards associated with the rankings, the method comprising:

receiving a wager;

dealing a plurality of playing cards into a hand;

if and only if the dealt hand has one of the award-winning rankings, distinguishing winning ones of the cards that yield the award-winning ranking from other ones of the cards;

after the distinguishing step, drawing none or more replacement cards to replace none or more of the cards in the dealt hand to form a final hand; and determining a poker hand ranking of the final hand; and providing an award when the determined poker hand ranking meets a predetermined criterion.

22. The method of claim 21, wherein the distinguishing step occurs automatically without player input.

23. The method of claim 22, wherein the distinguishing step includes flashing the winning ones of the cards.

24. The method of claim 21, wherein the distinguishing step occurs in response to player input.

25. The method of claim 24, wherein the distinguishing step includes labeling the winning ones of the cards as cards to be held.

* * * * *